Sept. 17, 1963  L. E. ROSEMOND ET AL  3,104,290
MULTIPHASE EYEGLASS-HEARING AID UNIT
Filed Feb. 25, 1957  4 Sheets-Sheet 4
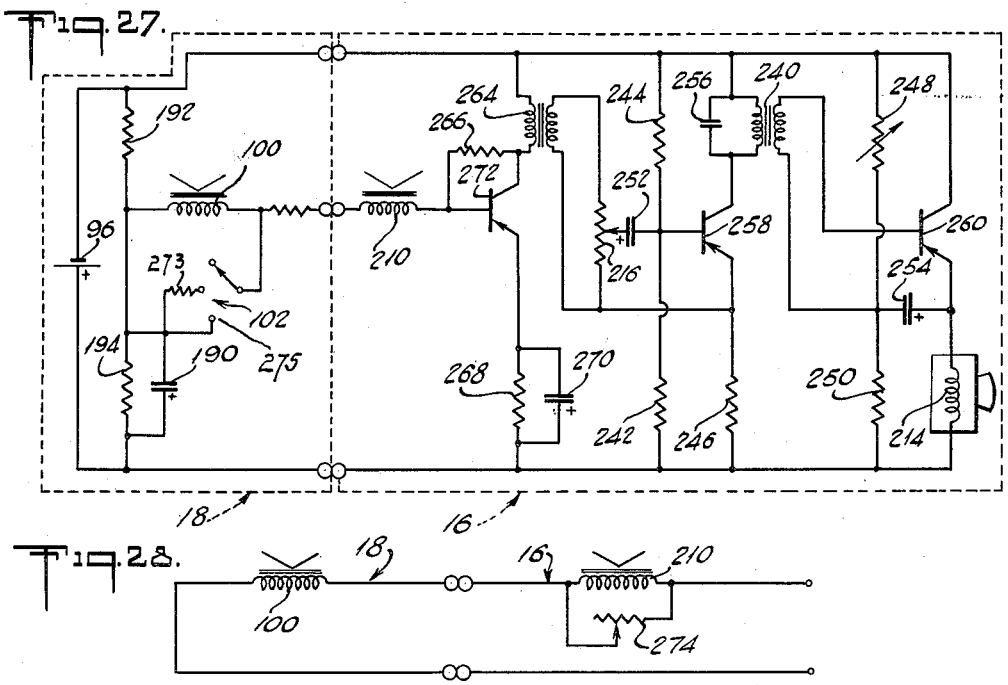
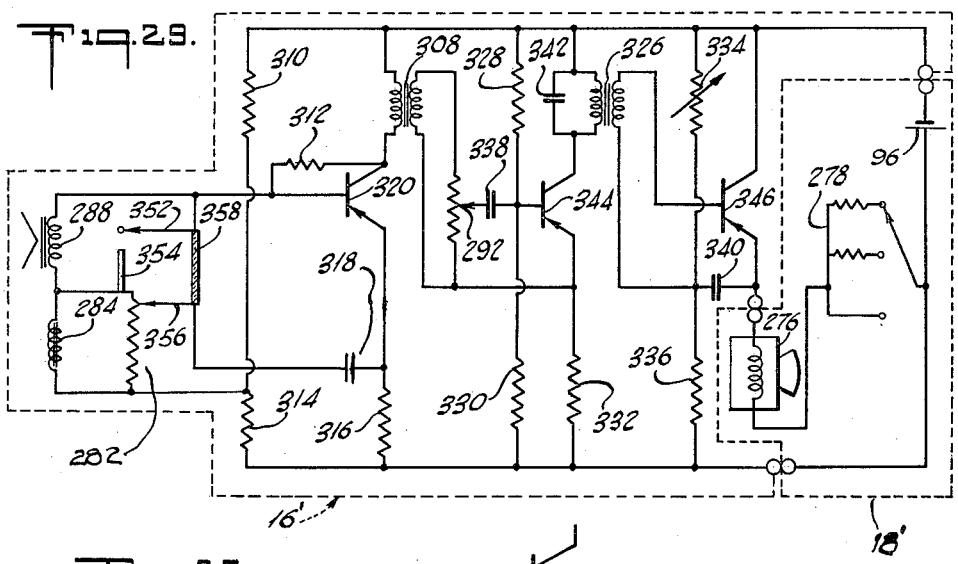
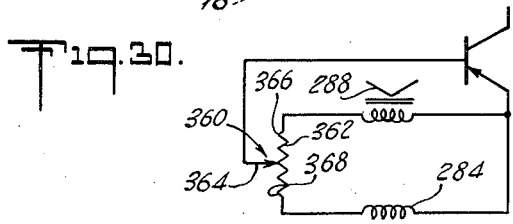
INVENTORS
LELAND E. ROSEMOND
WILLIAM GREENBAUM
BY KAARE HELLEKJAER
Henry L. Burkitt
ATTORNEY United States Patent Office 3,104,290
Patented Sept. 17, 1963

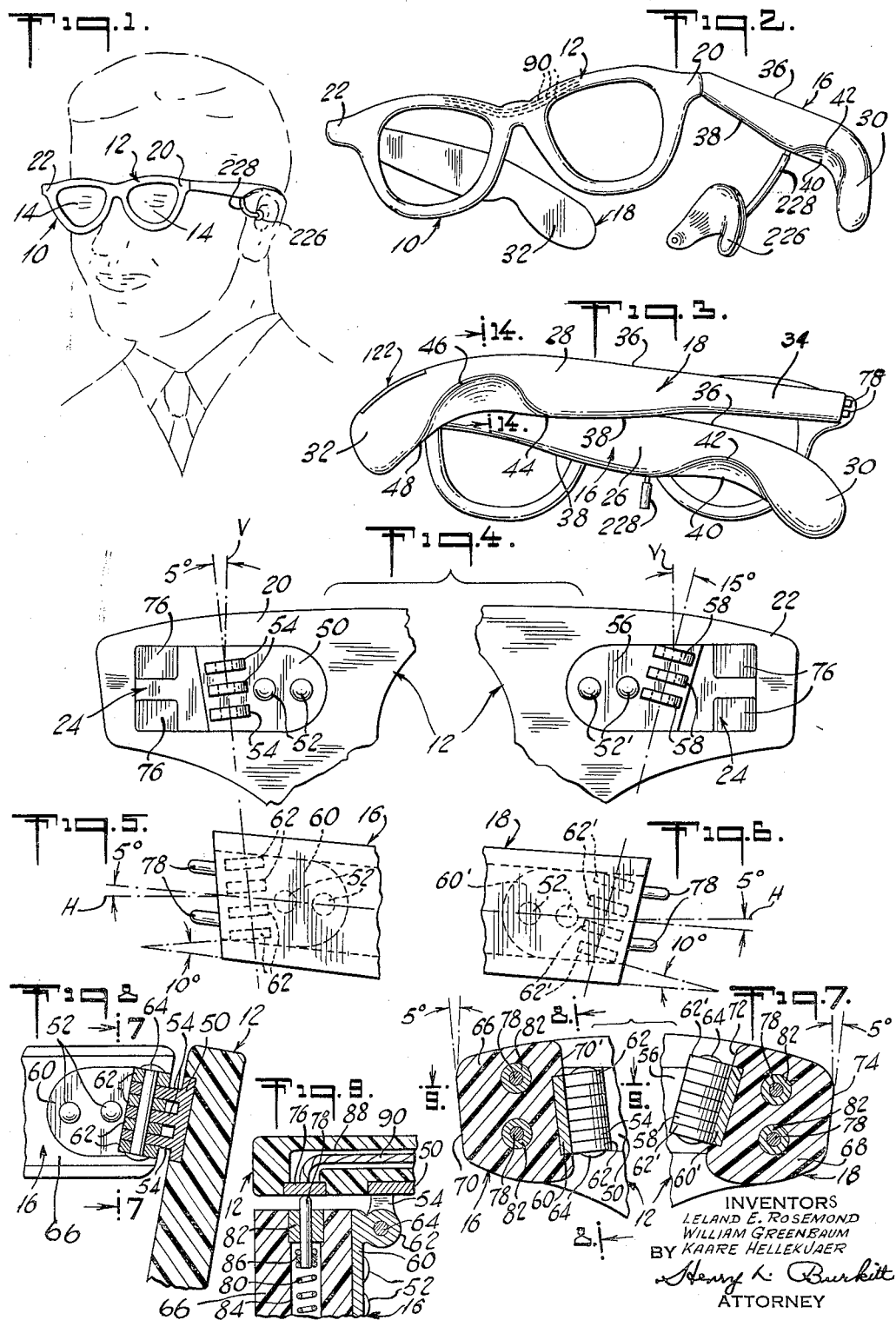

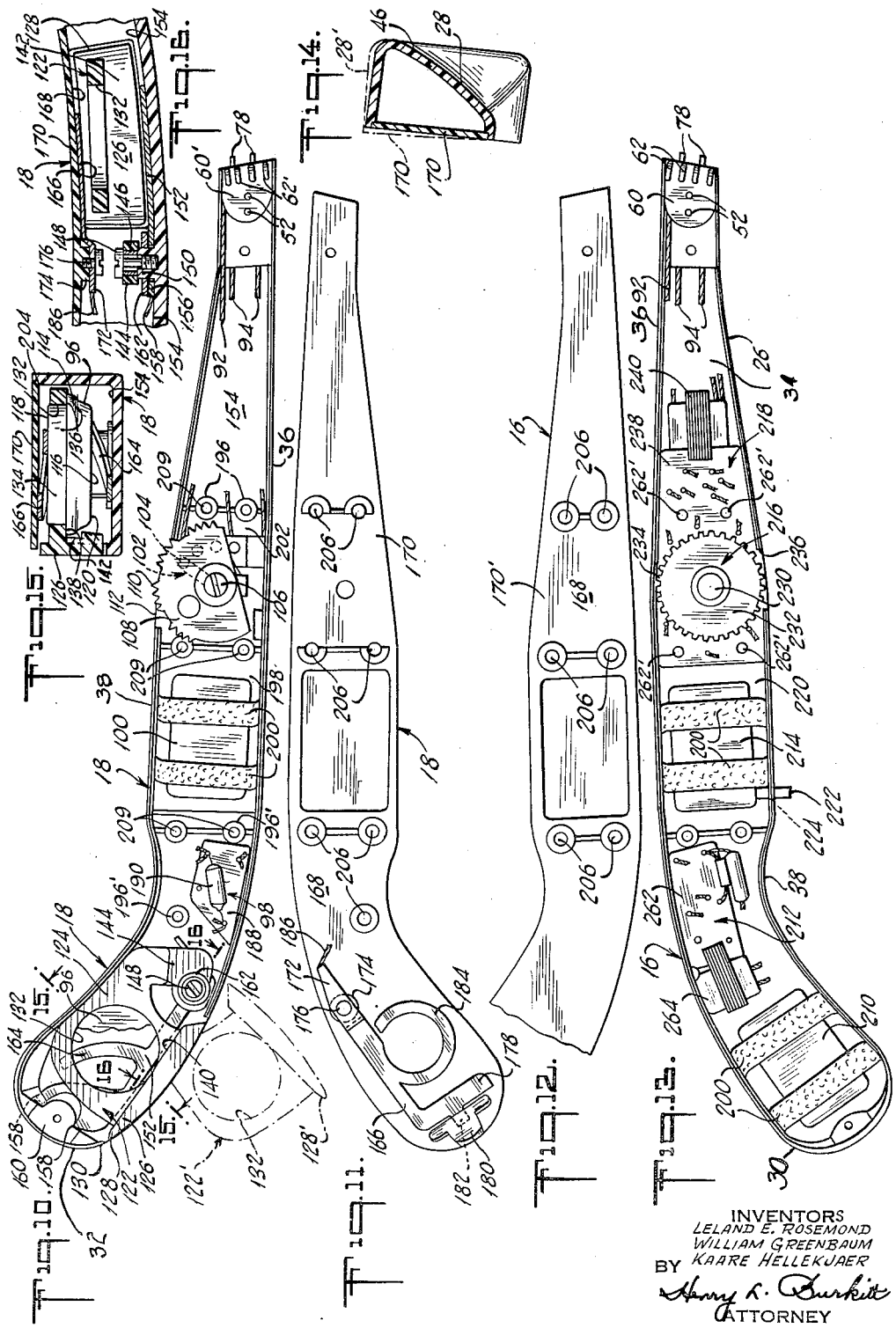

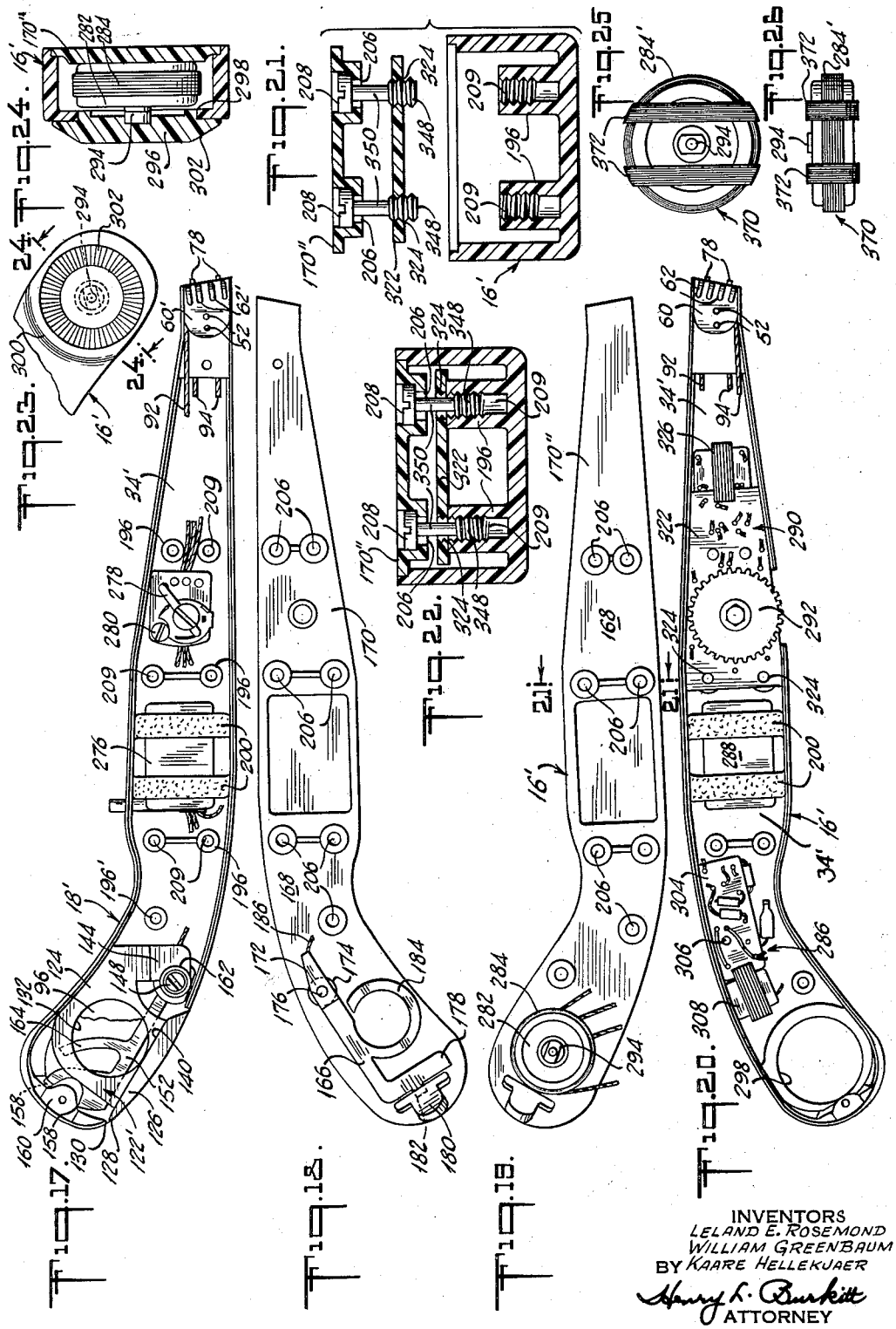

3,104,290
MULTIPHASE EYEGLASS-HEARING AID UNIT
Leland E. Rosemond, Scarborough, William Greenbaum, Elmsford, and Kaare Hellekjaer, Irvington, N.Y., assignors to Otarion, Inc., New York, N.Y., a corporation of New York
Filed Feb. 25, 1957, Ser. No. 642,160
8 Claims. (Cl. 179—107)

This invention relates to a multiphase eyeglass-hearing aid unit.

One object of the present invention is to provide an improved combination eyeglass frame and hearing aid unit which is of minimum bulk and weight, esthetically attractive in appearance, and efficient and reliable in operation. Pursuant to this object of the present invention substantially all of the hearing aid components, with the exception of the air tube and ear piece, are housed and concealed in the temples of the eyeglasses without deteriorating the acoustical and electrical properties of the hearing aid.

Another object of the present invention is the provision, in a combination eyeglass frame and hearing aid unit of the aforenoted character, of an improved temple design and construction to minimize the bulk and conspicuousness thereof when worn by the wearer, and to facilitate the custom adjustment of the eyeglass frame to the wearer.

Another object of the present invention is to provide an eyeglass structure into which a hearing aid unit is incorporated in the aforenoted manner, wherein the temples and front frame are interconnected to provide for the lateral offsetting of the temples in their folded condition to thereby provide for the neat and compact foldability of the eyeglass structure, the temples in their unfolded or extended condition being arranged in standard manner to each other and to the front frame.

Another object of the present invention is the provision in a unit in which eyeglasses and hearing aid are combined, of a power source for the hearing aid mounted in one temple of the eyeglasses so that it may be removed and replaced in a quick and facile manner, and yet be fully protected and concealed from view.

Another object of the present invention is to provide a unitary eyeglass and hearing aid combination wherein separable and separate subassemblies of hearing aid components are assembled to, and supported in, the temples in a novel and improved manner, the assembly technique insuring the proper location of the subassembly components in the temples.

Another object of the present invention is the provision of an eyeglass structure into which a bilateral hearing aid unit is incorporated, the structure being characterized by the provision of a microphone in each temple for improved directional pick-up.

Another object of the present invention is the provision of an eyeglass structure into which a hearing aid unit is incorporated having a telephone pickup which picks up the desired signals by magnetic induction coupling with the telephone receiver coil, thereby eliminating the objections and disadvantages of a hearing aid wearer when using a telephone.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions, FIG. 1 is a view in perspective showing a unitary eyeglass and hearing aid combination embodying features of the invention and in position on a wearer;

FIG. 2 is a perspective view of a unitary eyeglass and hearing aid combination with the temples shown in their unfolded or worn position;

FIG. 3 is a rear elevational view thereof with the temples shown in their folded position;

FIG. 4 is a fragmentary rear view showing the mounting of the hinge plates to the front frame, to an enlarged scale;

FIG. 5 is a fragmentary enlarged rear view showing the mounting of the hinge plate to the left temple as viewed from the rear of the eyeglasses, the temple being in a folded position;

FIG. 6 is a view similar to FIG. 5 with respect to the right temple;

FIG. 7 is an enlarged sectional view showing the hinge attachment at the temples, said view being taken on the line 7—7 of FIG. 8;

FIG. 8 is an enlarged sectional view taken on the line 8—8 of FIG. 7;

FIG. 9 is an enlarged sectional view taken on the line 9—9 of FIG. 7;

FIG. 10 is a side elevational view of one of the temples with the cover plate removed;

FIG. 11 is a side elevational view showing the underside of the cover plate for the temple shown in FIG. 10;

FIG. 12 is a view similar to FIG. 11 showing the cover plate for the other temple;

FIG. 13 is a view similar to FIG. 10 showing the other temple;

FIG. 14 is a sectional view, on an enlarged scale, taken on the line 14—14 of FIG. 3;

FIG. 15 is a sectional view, on an enlarged scale, taken on the line 15—15 of FIG. 10 with the battery in position;

FIG. 16 is a sectional view, on an enlarged scale, taken on the line 16—16 of FIG. 10 with the battery removed;

FIG. 17 is a side elevational view of one of the temples, with the cover plate removed, of another embodiment of the present invention;

FIG. 18 is a side elevational view showing the underside of the cover plate for the temple shown in FIG. 17;

FIG. 19 is a view similar to FIG. 18 showing the cover plate for the other temple;

FIG. 20 is a view similar to FIG. 17 showing the other temple;

FIG. 21 is a sectional view, on an enlarged scale, taken on the line 21—21 of FIG. 19 and showing the manner of assembly of the separate subassemblies to the cover plate preparatory to the assembly of the latter to the temple;

FIG. 22 is a view similar to FIG. 21 after the cover plate has been assembled to the temple;

FIG. 23 is a fragmentary side elevational view of the ear piece part of the temple of FIG. 20 to illustrate the manner of association of the manual control for the telephone pickup switch and volume control;

FIG. 24 is a sectional view, on an enlarged scale, taken on the line 24—24 of FIG. 23;

FIG. 25 is a side elevational view of a modified form of telephone pickup coil;

FIG. 26 is an edge view thereof;

FIG. 27 is a wiring diagram for a hearing aid unit of the type illustrated in FIGS. 10–13;

FIG. 28 represents a modification of the wiring diagram illustrated in FIG. 27;

FIG. 29 is a wiring diagram for a hearing aid unit of the type illustrated in FIGS. 17–20; and FIG. 30 represents a modification of the wiring diagram illustrated in FIG. 29.

Referring to the drawings in detail, there is shown in FIGS. 1–3, a pair of eyeglasses 10 which comprises a front frame 12 which mounts lenses 14. A pair of temples 16 and 18 are associated with the respective end portions 20 and 22 of frame 12 by means of hinges 24 in the manner to be described in detail below. Eyeglasses 10 are constructed to house and support a hearing unit; for this purpose, temple 16 and 18 may take the form of hollow housings 26 and 28, resp., within which hearing aid components are disposed.

The temples are structurally similar, differing in the respects to be pointed out in detail below. The temples may be produced by molding plastic into the desired shape. The respective ear parts 30 and 32 are bowed inwardly and downwardly to conform to the head contour of the wearer. Each of the temple housings 26 and 28 has an outer side wall 34 and top and bottom walls 36 and 38, resp., the ear parts 30 and 32 at the side and bottom walls 34 and 38, resp. being recessed as indicated at 40 (FIGS. 1–3 and 14) to interfit with the wearer's ear at the back thereof. The recesses 40 are shaped to interfit with the ear and the housing section thereat smoothly and curvingly tapers from the top edge 42 thereof to the bottom wall 38, resulting in a reduced housing cross section which has its maximum reduction substantially along the line 14—14 of FIG. 3 (see FIG. 14). The top edge 42 of the recesses is relatively steeply curved from the forward point 44 to the point 46 along the plane of the line 14—14 and from that point gradually descends to the rearward point 48 in a smooth curve, the housing section being gradually reduced from the points 44 and 48 to point 46 at the plane of minimum ear part cross section, the latter being generally triangular. The temples are relatively thick to accommodate the various hearing aid components and the necessary thickness of the temples is made less conspicuous and the eyeglasses are made more attractive on the wearer by the ear recesses 40 which interfit with the top of the ears so that the protrusion of the latter is minimized. It will thus be apparent that the recesses 40 are positioned at the region of contact with the wearer's ears and are shaped complementary thereto to interfit therewith. An additional advantage achieved by this construction and the type of material used is the permissibility of a limited amount of torsional movement, as indicated by the broken line 28' of FIG. 14, which takes place along the ear recesses. This limited torsional movement is sufficient to allow the ear part of the temples to conform to the shape of the head of the user to a degree and thus to avoid undue pressure of the ear parts on the head in back of the ears. The fitting of the eyeglasses to the wearer is also facilitated by this construction.

In accordance with the eyeglass construction of the present invention, the temples are foldable from an extended or open position in which the temples are substantially parallel pursuant to standard eyeglass construction to a closed position in which the temples are laterally offset in overlapped relation to the frame 12 as shown in FIG. 3. This offset foldability of the temples provides for the neat and compact folding of the glasses and the attendant convenience in carrying and storing the same. As shown in FIG. 4, the hinge plate 50 at the end portion 20 of frame 12 is secured thereto by rivets 52 along a horizontal axis with respect to the frame. The hinge barrels 54 are disposed in parallel relation at an inward angle of 5 degrees with the vertical axis V. An inward angle is referred to herein as an angle extending inwardly of the frame in a direction from the top of the frame towards the bottom thereof. The hinge plate 56 is similarly secured to the end portion 22 of the frame by rivets 52', the barrels 58 of the hinge plate being inwardly inclined at an angle of 15 degrees with the vertical axis V. The hinge plates 60 and 60' of the temples 16 and 18, resp. are structurally similar and the barrels 62 and 62' thereof extend at an angle of 10 degrees with respect to the longitudinal axes of the temples and hinge plates 60 and 60'. The companion barrels 54, 62 and 58, 62' are connected by screws 64 which serve to assemble the hinge plates to form the hinges 24 which connect the temples to the frame. The barrels of the hinges 24 are in parallel relation in their assembled condition and it will be apparent that in the folded position of the eyeglasses the left temple, as viewed from the rear of the eyeglasses, will extend approximately 5 degrees down from the horizontal and the right temple will extend approximately 5 degrees up from the horizontal achieving the lateral offset relation of the temples. Thus the inclination of the barrels 62 and 62' has the effect of lowering the inclination of the temples in their folded condition 10 degrees from the angular disposition of the barrels 54 and 58 on the frame, the left temple being lowered 10 degrees from a 5 degree up inclination to a 5 degree down inclination and the right temple being lowered 10 degrees from a 15 degree up inclination to a 5 degree up inclination. The hinge plates 60 and 60' are secured by rivets 52 to the plug members 66 and 68, resp. which are adhesively secured in the respective temple housings 26 and 28, at the inner end thereof. The hinge plate 60 is disposed in parallel relation with the side walls 70 and 70' of plug member 66 and with the side walls of the temple 16 so that the latter walls are disposed at a 5 degree inward angle pursuant to standard eyeglass construction. The side walls of temple 18 are similarly disposed at a 5 degree inward angle and since the barrels 58 and hinge plate 60' extend at a 15 degree inward angle, the plug member 68 is fabricated to provide the necessary 10 degree compensation. More particularly, the side wall 74 of plug member 68 is disposed in parallel relation with the temple sidewalls at a 5 degree inclination while the sidewall 72 to which hinge plate 60' is secured is disposed at a 15 degree inclination, providing the 10 degree compensation required to provide a uniform 5 degree inward temple inclination. The standard 10 degree pantoscopic angle of the frame 12 relative to the temples is obtained by a corresponding inclination of the hinge barrels with respect to the temples as shown in FIG. 8.

Each of the end portions 20 and 22 is provided with a pair of spaced contacts 76 which are positioned to engage related pin members 78 of the temples in their unfolded or extended positions. Folding of the temples through but a small portion of the movement to folded relation breaks the circuit through pin members 78 and contacts 76. The pin members 78 are biased into engagement with contacts 76 by the associated springs 80 (FIG. 9) when the temples are extended. The pin members 78 are mounted for axial movement in the bushings 82 and the latter and springs 80 are carried by the plug members 66, 68. The springs 80 are seated in the passages 84 of the plug members and are in circuit with pin members 78. One end of the springs 80 are suitably soldered to the pin members 78 as indicated at 86 and said connections serve as stops to limit the projection of the pin members from the temples in their unfolded position. Extending along frame 12 are suitable passages 88 for the three wires 90 which electrically interconnect the circuit components of the hearing aid housed in the temples. Two of the wires 90 electrically interconnect contacts 76 at the opposite end portions of the frame while the third wire 90 electrically connects the hinges at said opposite end portions. The hearing aid thus has a three-wire circuit, one wire being connected through the hinges 24 and forming a closed circuit at all times; the circuits for the other two wires being through the spring pin members 78 and being closed only when both temples are in their extended disposition. The wires 92 in the temples are electrically connected to the hinges while the wires 94 are connected to the springs 80, the three-wire circuit being completed when both temples are in their extended disposition.

Temples 16 and 18 house hearing aid components of a bilateral unit which is characterized by a microphone in each temple for improved directional pickup, there being provided a receiver in one of the temples to conduct sound to one ear. In temple 18 (FIG. 10) is housed a battery 96, a first stage amplifier subassembly 98, a microphone 100, and a control switch 102 therefor, the latter being of the three-position type with on, intermediate, and off positions to correspondingly control the microphone pickup. Switch 102 has a rotating finger 104 which is mounted to the central spindle 106, the switch being manually controlled by the wheel 108. The peripheral surface 110 of wheel 108 is serrated for ease of manual rotation and is made accessible for movement by the slot 112 formed in the bottom wall 38 of the temple, the wheel projecting slightly beyond the surface of said bottom wall.

Battery 96 (FIG. 15) may be of conventional construction and comprises a pair of shells 114 and 116 secured together with an insulating member disposed therebetween. Face 118 of shell 114 may form one electrical contact while the face 120 of shell 116 forms the other electrical contact. The battery is removably mounted in the carrier 122 (FIGS. 10, 15 and 16) which is pivotally mounted in the temple for movement from a closed position as shown in solid lines in FIG. 10 to an outward or open position as indicated at 122′ in which position the battery may be readily removed and replaced. The carrier 122 comprises a battery support 124 which is integrally molded with the wall piece 126, the latter forming a continuation of the top wall 36 of the temple at the end of the ear part 32 when the carrier is swung to its closed position. A narrow gap is left between the edge 128 of piece 126 and the adjacent edge 130 of wall 36 to permit edge 128 to be manipulated, as by means of the finger nail, so as to swing the carrier outwardly of the temple. The carrier has a circular aperture 132 for mounting the battery and the part 134 of shell 114 interfits therewith with the peripheral shoulder 136 of said shell abutting the peripheral edge 138 of support 124. The inner face 140 of the wall piece 126 is provided with a groove 142 of corresponding contour with aperture 132 for the reception of a segment of the peripheral shoulder 136 which interfits therewith. In practice a battery is positioned in the carrier when the latter is in an open position by positioning a segment of shoulder 136 in groove 142 of the carrier and thereafter pushing the part 134 into the aperture 132. The carrier has a projecting arm 144 which is provided with a bearing 146, there being provided a screw 148 which extends through bearing 146 and is threadedly engaged in the post 150, which is integrally formed with the temple housing 28, for pivotally mounting the carrier. The battery contact strip 152 is held in position adjacent the inner face 154 of the temple housing by the apertured fitting 156 at one end and by the prongs 158 at the opposite end which are embedded in the thickened portion 160 of the housing. The fitting 156 interfits with the post 150 and is held in place against face 154 by the insulating washer 162 which is cemented in position on fitting 156. The wire 158 is electrically connected to the fitting 156 and to subassembly 98. The contact strip 152 has a contact finger 164 which is spaced from the face 154 when out of battery contact and when a battery positioned in the carrier is swung to closed position the face 120 of the battery sweeps or wipes against said finger and depresses the latter towards face 154. This arrangement insures good electrical contact between the finger 164, which is spring urged against battery face 120, and the battery inner shell 116. The battery face 118 is in electrical contact with the contact strip 166 which is secured in position to the inner face 168 of the cover member 170. The contact strip 166 has a laterally projecting part 172 which is secured to the post 174 by a suitable fastener 176, the opposite end part 178 being secured to the thickened portion 180 of the cover member 170 by means of the tab 182 which is engaged in a slot provided in said portion 180. The contact strip 166 has a circular contact finger 184 against which the battery face 118 wipes as the carrier and battery are swung to closed position to thereby insure good electrical contact therebetween. The finger 184 is spring urged into engagement with the battery face 118 and thus the battery is spring biased from the opposite faces thereof by the opposite contact fingers 164 and 184. The contact strip 166 is in electrical contact with the wire 186. Thus the battery is readily removable and replaceable by means of the pivotal battery carrier 122 and when the latter is in a closed position the battery is contained and concealed in the temple.

Subassembly 98 may include a mounting plate 188, which may be formed of plastic or any other suitable material. A condenser 190 and resistors 192 and 194 may be mounted upon plate 188, the latter being snugly engaged against the inner face of the top wall 36 of the casing 28 and between the posts 196′ to hold the subassembly 98 in position in the casing. The microphone 100 is disposed in a compartment 198 and is provided with a pair of sponge rubber bands 200 which surround the microphone and which are compressed in the temple between the walls thereof to effectively mount the microphone in rubber to reduce the tendency to oscillation. The switch 102 is rigidly secured in the compartment 202 of the casing in any suitable manner as by means of an adhesive. The side of temple 18 left open in the molding operation, may be closed by the cover plate 170 which interfits with the peripheral shoulder 204 formed in the molding of the temple casing, the cover plate extending to the hinge barrels 62′. The cover plate 170 is provided with a series of shouldered openings 206 and the temple casing is provided with a registered series of tapped apertures 209 extending in posts 196 provided for that purpose for the reception of screws 208 (see FIGS. 21 and 22), which fasten the cover plate in position on the temple casing. Thus the cover plate is attached to the temple casing at a series of spaced points, as distinguished from a continuous securement around the periphery of the cover plate, to provide a degree of temple flexibility which facilitates temple adjustment to the wearer. In other words the cover plate is non-rigidly attached to the temple casing so that the temple is not a rigidly closed box. The casing 26 and cover plate 170′ of temple 16 are similarly non-rigidly secured to each other.

In temple 16 (FIG. 13) is housed a microphone 210, a first stage amplifier subassembly 212, a receiver 214, a volume or gain control 216, and a second and third stage amplifier subassembly 218. The microphone 210 is disposed in the ear part 30 of the temple and is mounted therein by the use of sponge rubber bands 200 in the manner of the microphone 100. The receiver 214 is similarly mounted by the use of bands 200 in the compartment 220 of the temple, the receiver having an air tube fitting 222 which extends through a companion aperture 224 in the bottom wall 38 of the temple casing 26. The fitting 222 is connected to the ear piece 226 by the air tube 228, the ear piece being shaped to fit and lock in the ear canal (FIGS. 1 and 2). The gain control 216 has a central spindle 230 to which is attached the wheel 232 which has a serrated peripheral edge 234, the latter being accessible for manual adjustment through the slot 236 provided in the bottom wall 38 of the temple. The gain control 216 is mounted on the mounting plate 238 of subassembly 218 and controls the sound volume to the ear piece 226 from both microphones 100 and 210. The mounting plate 238 is snugly engaged between the walls 36 and 38 of the temple 16. The mounting plate 238 mounts a transformer 240 at one end which rests on the side wall 34 of the temple, resistors 242, 244, 246, 248, and 250, condensers 252, 254, and 256, and transistors 258 and 260. Resistor 248 is variable, being set at the factory according to circuit requirements. Subassembly 218 is held in position by mounting screws 208 which pass through companion apertures 262' in mounting plate 238 and secure cover plate 170' to casing 26.

Subassembly 212 comprises a mounting plate 262 which mounts a transformer 264 at one end, said transformer being adhesively secured to wall 34 of the casing to retain subassembly 212 in position. The mounting plate mounts resistors 266 and 268, a condenser 270, and a transistor 272. The circuit is clearly shown in FIG. 27. A control is provided by switch 102 by which, in the position shown on FIG. 27, both microphones 100 and 210 are in circuit. When the switch point is moved to bring resistance 273 into the circuit, it shunts microphone 100, thus reducing its effectiveness. Finally, when the switch point is moved to point 275, microphone 100 will be shunted out of circuit completely, and only microphone 210 will function.

In FIG. 28, is shown a modification of the circuit of FIG. 27. Shunted across microphone 210 in temple 16 is a variable resistance 274. It is possible, by putting all the resistance in circuit, to make both microphones 100 and 210 effective. By cutting out substantially all the resistance, microphone 210 will be shunted out of the circuit. At intermediate positions of the adjustment, microphone 210 will have varying degrees of effectiveness. This may be desirable in some cases to minimize "feedback" from receiver 214 in the same temple.

The bilateral hearing aid renders the volume of the sounds received much less dependent on the direction from which they come and also gives to the wearer a better indication as to the direction of the sound source. If desired, microphones 100 and 210 may be designed to have different frequency responses to better enable the wearer to identify from which side sounds were coming. With a microphone in each temple and sound pickup distributed between the two, a reduction in the size of the microphones and in the space to house them may be made. The two microphones may be in phase for sound and out of phase for inductive coupling to eliminate power line hum, and the like.

With reference to FIGS. 17-20, there are shown temples 16' and 18' which house hearing aid components of a hearing aid unit which incorporates a telephone pickup which operates on a magnetic induction coupling principle. The temples 16' and 18' are structurally similar to the temples 16 and 18 previously described and are integrated with the frame 12 in a similar manner.

The temple 18' houses a battery 96, a receiver 276, and volume control 278 which is preset to control the maximum volume obtainable from the receiver. The battery is removably mounted in a carrier 122' which corresponds in all respects to the carrier 122 previously described and is integrated with the temple in a similar manner. The receiver 276 is mounted in the temple 18' in the manner of the receiver 214 of the bilateral hearing aid unit. The volume control 278 is a multiposition switch and is secured in position against the wall 34' of the temple by the screw 280.

The temple 16' houses a volume or gain control 282 having a coil winding 284 for telephone pickup, a first stage amplifier subassembly 286, a microphone 288, and a second and third stage amplifier subassembly 290 which mounts the gain control 292. The cover 170" corresponds to the cover 170' shown in FIG. 12 and at the ear part end mounts the control 282 and winding 284 as by the use of a suitable adhesive. The gain control 282 (see FIGS. 23 and 24) includes a central spindle 294 to which is secured the wheel 296 which interfits in the circular opening 298 provided in the wall 34' of the temple ear part, said wall being recessed thereat as indicated at 300 to accommodate the wheel 296. Thus the wheel 296 is disposed externally of the temple to control the gain control 282 and said wheel has a serrated peripheral surface 302 for ease of manual rotation.

The subassembly 286 comprises a mounting plate 304 which is held in place in the temple by a screw 208 which extends through a companion aperture 306 provided in the plate, in the manner to be described hereinafter. The plate 304 mounts a transformer 308 at one end which engages the wall 34', resistors 310, 312, 314 and 316, a condenser 318, and a transistor 320. The microphone 288 is provided with bands 200 and is retained in position in the temple in the manner previously described in connection with microphone 100.

The subassembly 290 comprises a mounting plate 322 which is also held in place in the temple by screws 208 which extend through comapnion apertures 324 provided in the plate. The subassembly 290 corresponds in all respects to the subassembly 218 previously described and utilizes the same components. Thus the mounting plate 322 mounts a transformer 326, resistors 328, 330, 334, and 336, condensers 338, 340, and 342, and transistors 344 and 346.

With reference to FIGS. 21 and 22, there is shown the manner of assembly of the subassembly 290 in the temple 16'. As previously noted the casings of the temples are provided with a series of posts 196 which are spaced to register with companion shouldered apertures 206 provided in the cover plates, said posts having tapped apertures 209 to receive the screws 208. The screws 208 are threaded at one end as indicated at 348 and have a reduced diameter shaft part 350 extending between the threaded part and the screw heads which seat against the shouldered apertures 206. For simplicity of illustration the plate 322 is shown without its associated components in FIGS. 21 and 22, it being understood that the plate supports the components of subassembly 290. The apertures 324 provided in the plate 322 are tapped to receive the threaded parts 348 of screws 208, said tapped apertures registering with the tapped apertures 209 of the posts 196. In practice, the plate 322 is secured in position relative to the cover plate 170" as shown in FIG. 21 by threading screws 208 into the tapped apertures 324 of the plate. This insures the correct positioning of the screws and plate 322 relative to the posts 196 for threaded engagement therewith; also the components carried by the plate will be disposed for properly oriented disposition in the temple casing. This assembly is then assembled to the casing by threading the screw parts 348 out of engagement with the tapped apertures 324 of the plate and into the tapped apertures 209 of the posts as shown in FIG. 22. The apertures 324 of plate 322 are now associated with the reduced diameter shafts 350 so that said plate and its associated components have limited floating movement in the temple. It will be understood that the subassembly 286 may be similarly mounted in the temple at the same time the cover plate is positioned on the temple housing for assembly therewith. As previously noted, the cover plate is secured in position at a series of spaced points and is thus non-rigidly attached to the temple casing so that the temple is not a rigidly closed box and has a degree of flexibility to facilitate adjustment.

The circuit integration of the various components of the telephone pickup hearing aid circuit is clearly indicated in FIG. 29. Gain control 282, which controls the sound volume of the telephone pickup, may include a snap action switch 352 diagrammatically shown as making electrical connection by a conductor 354 to the end of a potentiometer type gain control 356. An insulator plate 358 is shown for illustrative purposes only to illustrate the functioning of switch 352 and the gain control. Wheel 296 controls switch 352 and the gain control. The switch is normally "off" when the telephone pickup is not in use, when only gain control 292 controls the sound volume to the user. For telephone use, switch 352 is actuated by wheel 296 to connect with conductor 354 to shunt out microphone 288. Sound volume from telephone coil 284 will now be controlled by the gain control component 356, set by wheel 296, as well as by control 292. Control 292 requires no new adjustment at this time, only control 356 being adjusted. When switch 352 is moved to the closed position when the telephone pickup no longer is to be used, control 292, in the position to which the user previously adjusted, continues undisturbed.

In FIG. 30 there is shown a modification of the circuit of FIG. 29. Either telephone pickup coil 284 or microphone 288 may be placed completely in or out of operation or be faded in or out. A potentiometer type control 360 in the circuit may have a resistance 362 varied by a finger contacter 364 movable over the resistance. When the contacter is at point 366, coil 284 is cut out completely by resistance 362. Similarly when the contacter is at position 368, microphone 288 is completely cut out and coil 284 is fully cut in. The movement of the contacter along the resistance correspondingly fades one unit in and the other out as will be apparent.

It will be noted that the coil 284 will be parallel to the telephone receiver coil when in use so as to achieve a magnetic coupling between the two coils. However in a magnetic signal distribution system in a theatre and the like, the signal coil is usually in a horizontal plane and in order to provide reception and effective pickup in such a system, the modified form of coil 370 shown in FIGS. 25 and 26 is provided. The coil 370 differs from the coil 284 previously described in the addition of the windings 372 which extend in a plane perpendicular to the plane of coil 284' and are disposed in a substantially horizontal plane when the combination eyeglass and hearing aid is worn so as to give magnetic coupling with a horizontal signal coil. The coils 284' and 372 are connected in series so that they will pick up a signal from either a vertical or horizontal coil source.

The telephone pickup unit provides for the transference of the signals from the receiver to the amplifier circuit by magnetic induction and not by sound so that several important advantages are achieved. The quality of reproduction will be improved because of the elimination of distortions due to the resonant characteristics of the receiver diaphragm and of the microphone diaphragm. Ambient sounds in the room or area are eliminated because the microphone is normally inoperative when the telephone pickup is in use. The amplification of the hearing aid amplifier may be increased without whistling or "feed-back" since the sound output from the hearing aid cannot feed back to the amplifier input since the microphone is inoperative.

Many other changes could be effected in the particular constructions, and in the method of use and construction, and in specific details thereof, hereinbefore set forth, without substantially departing from the invention intended to be defined herein, the specific description being merely of embodiments capable of illustrating certain principles of the invention.

What is claimed as new and useful is:

1. Combination eyeglasses and hearing aid device, comprising a front frame having a pair of temples connected to the end portions of said frame, each temple comprising an outer side wall, a top wall and a bottom wall assembled to define a housing hollow throughout and opening inwardly toward the skull for the reception of hearing aid components of the hearing aid device, the walls of the housing being disposed so that the thickness of the housing is greater than the average distance between the skull and ear lobe of a wearer except at the groove between the ear lobe and the skull of the wearer, and a cover plate secured to close said opening, each temple extending beyond the groove between the skull and the ear lobe of the wearer and terminating in an inwardly and downwardly bowed ear part to conform to the head contouring of the wearer, said housing and cover plate being provided with registered apertures at spaced apart points, a hearing aid subassembly comprising a mounting plate having apertures in registry with said registered apertures, and screws extending through companion registered apertures for securing said cover plate to said housing, the apertures in the mounting plate being of limited extent so that the screws, when engaged to hold the parts together, extend through and are free of engagement of its screw threads with the mounting plate, the mounting plate thereby being free for limited movement with relation to the screws while retaining said subassembly in position.

2. Combination eyeglasses and hearing aid device, comprising a front frame having a pair of temples connected thereto, each temple being hollow to provide a housing having an open side for the reception of hearing aid components of the hearing aid device, and a cover plate removably secured to the open side of the housing, a hearing aid subassembly adapted for mounting in said housing comprising a mounting plate carrying hearing aid components, said housing, cover plate, and mounting plate being provided with registered apertures, the apertures in said housing and mounting plate being of the same size and being tapped, and screws having a threaded part and an unthreaded part, the threaded part of the screws providing means for engaging and holding the mounting plate internally of the housing while the cover plate is being positioned on the housing, the screws on engagement of their threaded parts to hold the cover plate and the housing together providing means to release the mounting plate to the unthreaded portion of the screws and for limited movement with relation to the cover plate and the housing.

3. Combination eyeglasses and hearing aid device, comprising a front frame having a pair of temples connected thereto, each temple being hollow to provide a housing having an open side for the reception of hearing aid components of the hearing aid device, and a cover plate removably secured to the open side of the housing, a hearing aid subassembly adapted for mounting in said housing comprising a mounting plate carrying hearing aid components, said housing, cover plate, and mounting plate being provided with registered apertures, the apertures in said housing and mounting plate being of the same size and being tapped, and screws having a threaded part and an unthreaded part, the threaded part of the screws providing means for engaging and holding the mounting plate internally of the housing while the cover plate is being positioned on the housing, the screws on engagement of their threaded parts to hold the cover plate and the housing together providing means to release the mounting plate to the unthreaded portion of the screws and for limited movement with relation to the cover plate and the housing, said housing apertures being disposed in upstanding posts integrally formed with said housing, said cover plate having thickened parts at the apertures thereof, said posts and thickened parts being spaced and said mounting plate being disposed therebetween for limited movement axially and laterally of said screws.

4. Combination eyeglasses and hearing aid device, comprising a front frame having a pair of temples connected thereto, said temples comprising hollow housings for the reception of hearing aid components of the hearing aid device, and a bilateral hearing aid unit disposed in said housings including a single amplification unit, a microphone in each housing, a receiver disposed in one of said housings in circuit with both microphones, and means controlling the effect of each microphone upon the single amplification unit.

5. Combination eyeglasses and bilateral hearing aid device, comprising a front frame having a pair of temples connected thereto, said temples comprising hollow housings for the reception of hearing aid components of the bilateral hearing aid device, the latter comprising a microphone and a control disposed in one housing, said control providing means for graduating the effect of the signal from that microphone; and a microphone, a receiver, and a second control disposed in the other housing, the second control providing means for controlling the combined effect of the microphones upon the signal delivered to the receiver.

6. Combination eyeglasses and bilateral hearing aid device, comprising a front frame having a pair of temples connected thereto, said temples comprising hollow housings for the reception of hearing aid components of the bilateral hearing aid device, the latter comprising a microphone and a control disposed in one housing, said control providing means for graduating the effect of the signal from that microphone; and a microphone, a receiver, and a second control disposed in the other housing, the second control providing means for controlling the combined effect of the microphones upon the signal delivered to the receiver, and adjustable control means for said microphone in said other housing to decrease the output thereof relative to the output of said first mentioned microphone to minimize feedback due to receiver signals introduced to said other housing microphone.

7. Combination eyeglasses and bilateral hearing aid device, comprising a front frame having a pair of temples connected thereto, said temples comprising hollow housings for the reception of hearing aid components of the bilateral hearing aid device, the latter comprising a microphone and a control disposed in one housing, said control providing means for graduating the effect of the signal from that microphone; and a microphone, a receiver, and a second control disposed in the other housing, the second control providing means for controlling the combined effect of the microphones upon the signal delivered to the receiver, said microphones having different frequency responses for identification of the side of the sound source.

8. Combination eyeglasses and hearing aid device, comprising a front frame having a pair of temples connected thereto, said temples comprising hollow housings for the reception of hearing aid components of the hearing aid device, said hearing aid device incorporating a telephone pickup coil disposed in one of said housings, and a receiver in circuit with said unit device and said pickup coil, said coil being in a generally vertical plane in one housing to pick up the desired telephone signals by magnetic induction coupling with the telephone receiver coil, and additional pickup coil means disposed in a generally horizontal plane for magnetic induction coupling with a signal coil disposed in a generally horizontal plane.

References Cited in the file of this patent

UNITED STATES PATENTS

| | | |
|---|---|---|
| D. 178,620 | Tresise | Aug. 28, 1956 |
| 1,842,377 | Gagnon | Jan. 26, 1932 |
| 2,444,302 | Lybarger | June 29, 1948 |
| 2,530,621 | Lybarger | Nov. 21, 1950 |
| 2,650,267 | Walters | Aug. 25, 1953 |
| 2,765,373 | Smith | Oct. 2, 1956 |
| 2,783,312 | Mouzon | Feb. 26, 1957 |
| 2,792,457 | Zapelloni | May 14, 1957 |
| 2,794,085 | De Angelis | May 28, 1957 |
| 2,878,322 | Posen | Mar. 17, 1959 |
| 2,891,116 | Nichols | June 16, 1959 |
| 2,915,598 | Brunton | Dec. 1, 1959 |
| 2,930,858 | Hollingsworth | Mar. 29, 1960 |
| 2,952,748 | Posen et al. | Sept. 13, 1960 |

FOREIGN PATENTS

| | | |
|---|---|---|
| 541,987 | Italy | Apr. 12, 1956 |
| 723,981 | Great Britain | Feb. 16, 1955 |
| 737,112 | Great Britain | Sept. 21, 1955 |
| 761,169 | Great Britain | Nov. 14, 1956 |
| 794,347 | Great Britain | Apr. 30, 1958 |
| 879,619 | France | Nov. 30, 1942 |
| 889,990 | France | Oct. 25, 1943 |
| 892,450 | France | Jan. 10, 1944 |
| 907,403 | France | Mar. 12, 1956 |
| 950,199 | France | Sept. 20, 1949 |

OTHER REFERENCES

Telex 960 publication, Form 502025, page 10, December 1956.

Cleartone "700" publication, page 6, November 1950.